Sept. 20, 1932.     L. A. BIXBY     1,877,794
TRANSMISSION
Filed Aug. 18, 1930
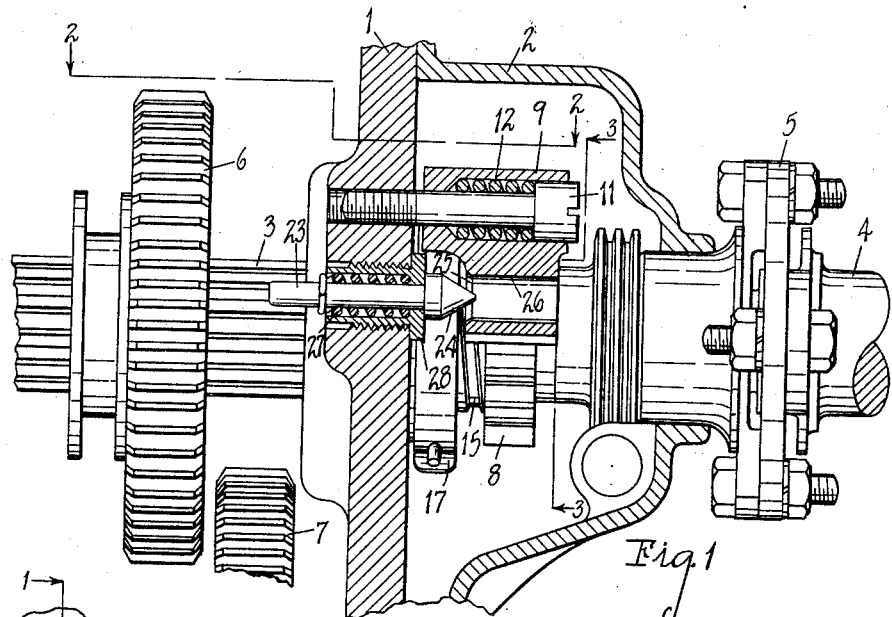
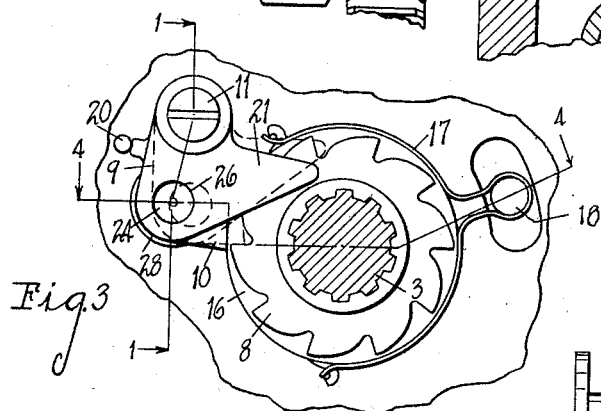
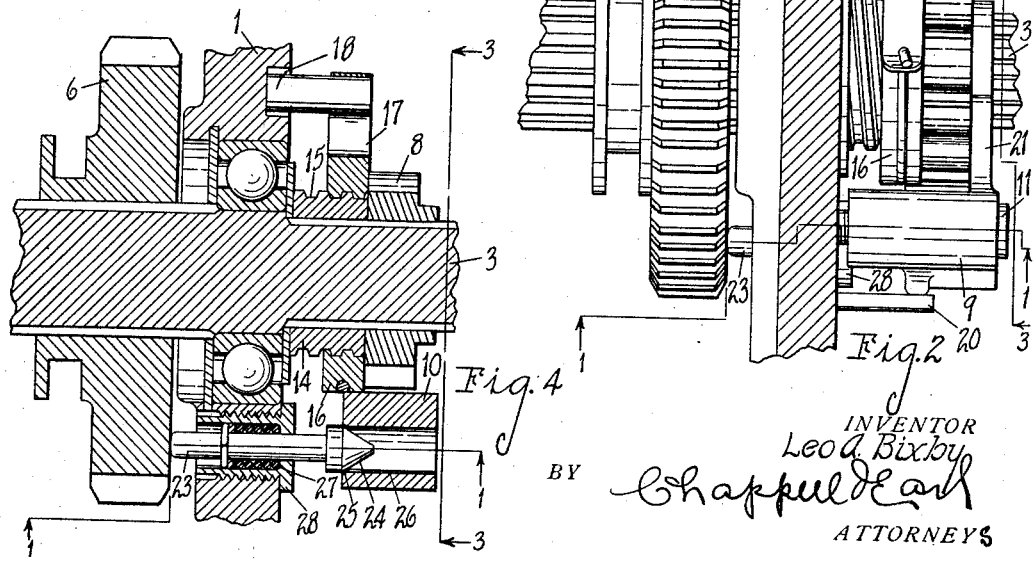
INVENTOR
Leo A. Bixby
BY Chappell Earl
ATTORNEYS Patented Sept. 20, 1932

1,877,794

UNITED STATES PATENT OFFICE

LEO A. BIXBY, OF KALAMAZOO, MICHIGAN, ASSIGNOR TO FULLER & SONS MANUFACTURING CO., OF KALAMAZOO, MICHIGAN, A SUBSIDIARY OF UNIT CORPORATION OF AMERICA

TRANSMISSION

Application filed August 18, 1930. Serial No. 475,899.

The main objects of this invention are:

First, to provide a transmission mechanism for motor vehicles in which the driven or propeller shaft is automatically locked against reverse rotation when the vehicle is stopped, but released on the adjustment of the transmission to reversing position.

Second, to provide a structure having these advantages which may be easily embodied in types of transmissions now in very extensive use.

Third, to provide a structure of the class described which is very simple in its parts.

Objects pertaining to details and economies of construction and operation of my invention will definitely appear from the detailed description to follow. The invention is defined in the claims.

A structure which embodies the features of my invention is clearly illustrated in the accompanying drawing, in which:

Fig. 1 is a fragmentary view of a transmission mechanism embodying the features of my invention, partially in section on lines 1—1 of Figs. 2, 3 and 4.

Fig. 2 is a fragmentary view of my improved transmission mechanism partially in section on broken line 2—2 of Fig. 1.

Fig. 3 is a fragmentary transverse section on lines 3—3 of Figs. 2 and 4.

Fig. 4 is a fragmentary section on line 4—4 of Fig. 3.

Referring to the accompanying drawing, 1 represents a transmission housing and 2 an auxiliary housing mounted thereon. 3 represents the driven shaft of a transmission and 4 the propeller shaft of a motor vehicle which is connected to the driven shaft by the universal joint 5.

The reverse gear 6 of the transmission is splined to the shaft 3 and is shiftable thereon into and out of mesh with its coacting driving gear 7. The other gears of the transmission are not illustrated as it is believed this disclosure will enable those skilled in the art to embody my improvements as may be desired.

On the shaft 3 I mount a ratchet wheel 8 for rotation with the shaft. The coacting holding pawl 9, which has a ratchet engaging member 10, is pivotally mounted on the pin 11 projecting from the transmission housing. The pawl is mounted for limited longitudinal movement on this pin and held yieldingly in position thereon by the coiled spring 12, the purpose of this being to permit the pawl to yield under conditions hereinafter pointed out. The ratchet wheel is provided with a hub extension 14 having a screw thread 15 thereon.

The stop disk 16 engages this thread 15 and is frictionally held against rotation by the spring friction member 17 which is held against rotation by a pin 18 on the friction member engaging recess in the housing. When this stop disk is in the position shown in Fig. 4 it holds the pawl out of engagement with the ratchet, thereby permitting reverse rotation of the shaft. The pitch of the threads is such that the stop member is moved to this position by the reverse rotation of the shaft, and to the position shown in Fig. 1, which is the pawl releasing position, by the forward rotation of the shaft. A stop 20 limits the outward swing of the pawl.

A finger-like friction member 21 coacts with the side of the ratchet wheel to actuate the pawl. Rotation of the shaft in a forward direction thus tends to throw the pawl away from the ratchet wheel and out of engagement while reverse rotation of the shaft moves the pawl toward the ratchet wheel and into engagement. The coil spring 12 acts to keep a constant pressure between the friction member 21 and the ratchet wheel 8.

To restrain the pawl when the reversing gear is shifted to operative position, I provide a plunger 23 having a conical tip 24 coacting with the opening 26 in the pawl, the opening having a beveled edge 25. This plunger is normally held in retracted position by means of the coiled spring 27. The plunger is arranged in a tubular holder 28 threaded into an opening provided thereby in the wall of the transmission.

When the reversing element of the transmission is shifted to the position shown in Fig. 4, the pawl is moved to retracted position, allowing the stop member 16 to move to the position shown, in which position re-engagement of the pawl is prevented until the shaft is again rotated in a forward direction which carries the stop member out of operative position.

My improvements are particularly desirable for use on taxicabs and the like, or on vehicles used in crowded traffic as inadvertent or unintentional rearward movement of the vehicle is prevented. The propeller shaft is held against reverse rotation until the transmission has been shifted into reverse.

I have illustrated and described my improvements in a very simple and practical embodiment. I have not attempted to illustrate various embodiments and adaptations which I contemplate as it is believed that this disclosure will enable those skilled in the art to embody or adapt my improvements as may be desired.

Having thus described my invention, what I claim as new and desire to secure by Letters Patent, is:

1. In a structure of the class described, the combination of a transmission including a shiftable reversing gear, a driven shaft operatively associated with said transmission, a ratchet wheel rotatable with said shaft, a holding pawl coacting with said ratchet wheel to hold the same against reverse rotation and having a friction member coacting with the side of the ratchet wheel and acting to shift the pawl to engaging position on reverse rotation of the shaft, the shaft being provided with a screw thread disposed at the side of said ratchet wheel, a pawl stop disk coacting with said thread, a friction member coacting with said disk so that the disk is moved into operative position on the reverse rotation of the shaft and into inoperative position on the forward rotation of the shaft, and a pawl restraining plunger provided with a return spring and positioned to be actuated by said reversing gear when it is shifted to operative position.

2. In a structure of the class described, the combination of a transmission including a shiftable reversing gear, a driven shaft operatively associated with said transmission, a ratchet wheel rotatable with said shaft, a holding pawl coacting with said ratchet wheel to hold the same against reverse rotation, friction means acting to shift the pawl to engaging position on reverse rotation of the shaft, the shaft being provided with a screw thread disposed at the side of said ratchet wheel, a pawl stop disk coacting with said thread, a friction member coacting with said disk so that the disk is moved into operative position on the reverse rotation of the shaft and into inoperative position on the forward rotation of the shaft, and a pawl restraining plunger provided with a return spring and positioned to be actuated by said reversing gear when it is shifted to operative position.

3. In a structure of the class described, the combination of a transmission including a shiftable reversing gear, a driven shaft operatively associated with said transmission, a ratchet wheel rotatable with said shaft, a holding pawl coacting with said ratchet wheel to hold the same against reverse rotation and having a friction member coacting with the side of the ratchet wheel and acting to shift the pawl to engaging position on reverse rotation of the shaft, a screw driven with said shaft, a stop disk coacting with said screw, a friction member coacting with said disk so that the disk is moved into operative position on the reverse rotation of the shaft and into inoperative position on the forward rotation of the shaft, and a pawl restraining plunger operatively associated with said reversing gear to be actuated thereby when it is shifted to operative position.

4. In a structure of the class described, the combination of a transmission including a shiftable reversing gear, a driven shaft operatively associated with said transmission, a ratchet wheel rotatable with said shaft, a holding pawl coacting with said ratchet wheel to hold the same against reverse rotation, friction means acting to shift the pawl to engaging position on reverse rotation of the shaft, a screw driven with said shaft, a stop disk coacting with said screw, a friction member coacting with said disk so that the disk is moved into operative position on the reverse rotation of the shaft and into inoperative position on the forward rotation of the shaft, and a pawl restraining plunger operatively associated with said reversing gear to be actuated thereby when it is shifted to operative position.

5. In a structure of the class described, the combination of a transmission including a shiftable reversing element, a driven shaft operatively associated with said transmission, a ratchet wheel rotatable with said shaft, a coacting holding pawl, friction means acting to shift said pawl to engaging position on the reverse rotation of the shaft, a pawl stop disk having a screw connection with said shaft, a friction member coacting with said disk so that the disk is moved to and from operative position by the reversing of the direction of rotation of the shaft, and a pawl restraining plunger operatively associated with said reversing element of said transmission whereby said pawl is disengaged on the actuation of said reversing element.

6. In a structure of the class described, the combination of a transmission including a shiftable reversing element, a driven shaft operatively associated with said transmission, a ratchet wheel rotatable with said shaft, a coacting holding pawl, means acting to shift said pawl to engaging position on the reverse rotation of the shaft, a pawl stop member having a screw connection with said shaft so that it is moved to and from operative position by the reversing of the direction of rotation of the shaft, and a pawl restraining member operatively associated with said reversing element of said transmission whereby said pawl is disengaged on the actuation of said reversing element.

7. In a structure of the class described, the combination of a transmission including a shiftable reversing element, a driven shaft operatively associated with said transmission, a ratchet means including a pawl acting to hold said shaft against reverse rotation, a pawl stop disk operatively threaded to said shaft so that it is moved to operative position on the reverse rotation of the shaft and into inoperative position on the forward rotation of the shaft, and a pawl restraining means operatively associated with said reversing element of said transmission whereby the pawl is shifted to inoperative position when said restraining element is actuated to operative position.

8. In a structure of the class described, the combination of a transmission including a shiftable reversing element, a driven shaft operatively associated with said transmission, means acting to hold said shaft against reverse rotation, a member for holding said means in inoperative position operatively threaded to said shaft so that it is moved to operative position on the reverse rotation of the shaft and into inoperative position on the forward rotation of the shaft, and a restraining means for said holding means operatively associated with said reversing element of said transmission whereby it is moved to inoperative position when said restraining element is actuated to operative position.

In witness whereof I have hereunto set my hand.

LEO A. BIXBY.